Figure 3:
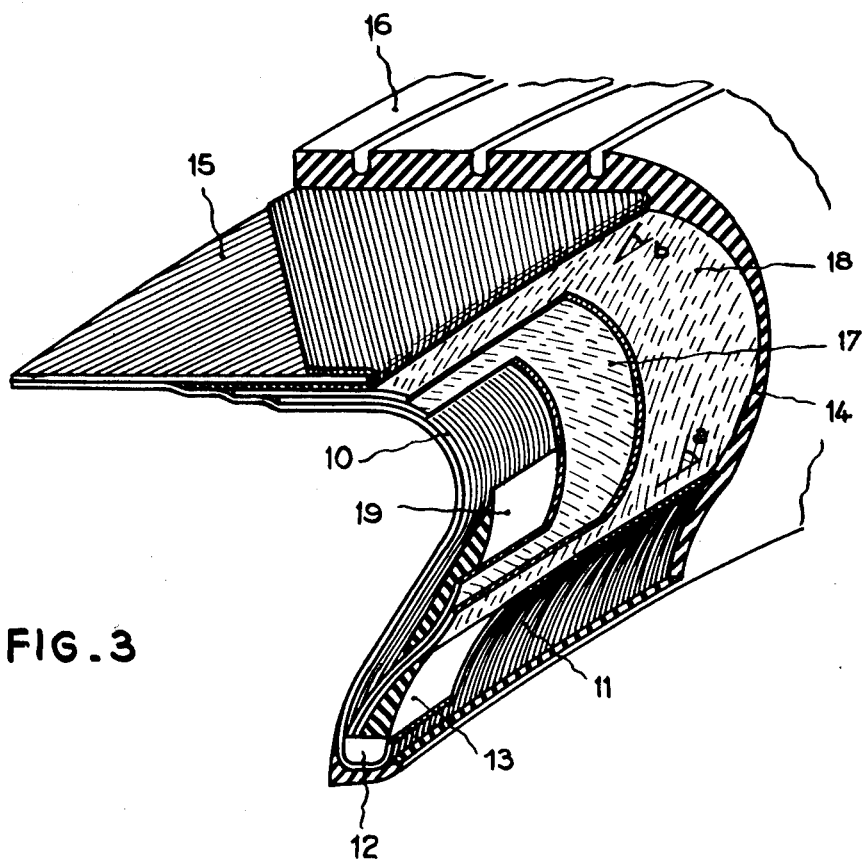

United States Patent [19]
Masson

[11] 4,067,372
[45] Jan. 10, 1978

[54] RADIAL TIRE HAVING SIDEWALLS REINFORCED WITH A RUBBERY MIXTURE HAVING A HIGH MODULUS

[75] Inventor: Yves Masson, Paris, France

[73] Assignee: Pneumatiques Caoutchouc Manufacture et Plastiques Kleber-Colombes, France

[21] Appl. No.: 553,117

[22] Filed: Feb. 26, 1975

[30] Foreign Application Priority Data

Feb. 26, 1974 France .................................. 74.06958

[51] Int. Cl.² .......................... B60C 9/02; B60C 9/18
[52] U.S. Cl. ........................... 152/354 R; 152/361 R; 152/361 FP
[58] Field of Search ..... 152/361 R, 361 FP, 361 DM, 152/354, 355, 357, 362 R, 362

[56] References Cited

U.S. PATENT DOCUMENTS

| | | | |
|---|---|---|---|
| 3,052,275 | 9/1962 | Hylbert, Jr. | 152/354 |
| 3,192,984 | 7/1965 | Bourdon | 152/354 |
| 3,301,303 | 1/1967 | Travers | 152/362 R |
| 3,404,721 | 10/1968 | Massoubre | 152/361 FP |
| 3,480,065 | 11/1969 | Verdier | 152/354 |
| 3,481,386 | 12/1969 | Menell et al. | 152/361 R |
| 3,509,930 | 5/1970 | Mirtain | 152/354 |
| 3,717,190 | 2/1973 | Boileau | 152/361 FP |
| 3,888,292 | 6/1975 | Menell et al. | 152/362 R |
| 3,904,463 | 9/1975 | Boileau | 152/354 |
| 3,911,987 | 10/1975 | Takusagawa et al. | 152/354 |

Primary Examiner—Drayton E. Hoffman
Attorney, Agent, or Firm—Craig & Antonelli

[57] ABSTRACT

A tire with a radial carcass and a top belt under the tread, has sidewalls which are reinforced by layers of a rubbery mixture exhibiting a high modulus of elasticity and extending over the entire height of the sidewalls. The upper edges of these reinforcement layers are inserted between the carcass and the lateral edges of the belt.

9 Claims, 3 Drawing Figures

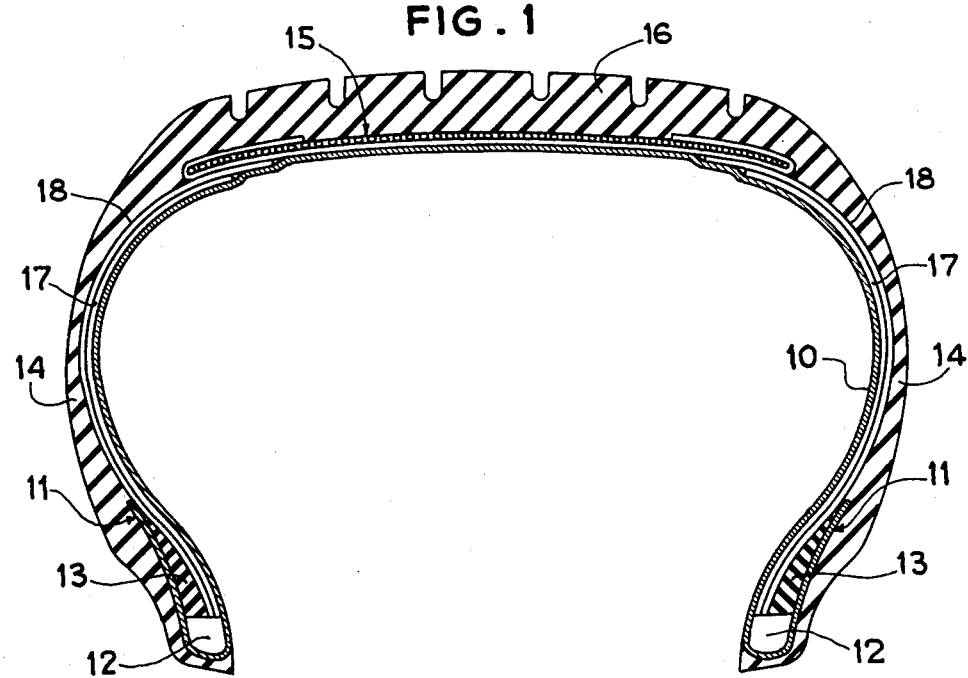
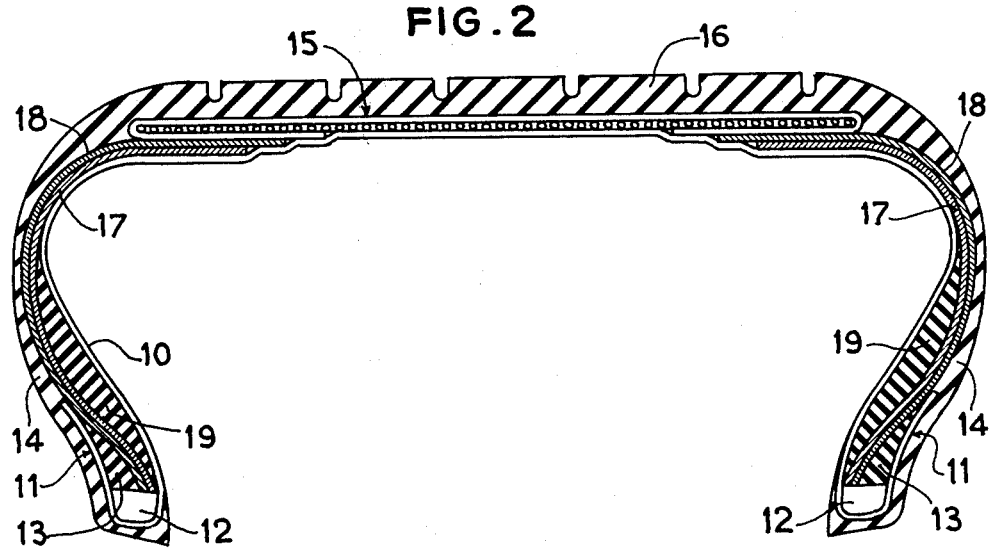

RADIAL TIRE HAVING SIDEWALLS REINFORCED WITH A RUBBERY MIXTURE HAVING A HIGH MODULUS

The present invention relates to improvements of tires of the type having a radial carcass and a top belt placed under the tread.

It is known that tires of this type have a certain number of advantages, particularly a better resistance to wear and tear, less resistance to movement, a good road behavior and a good adherence to the ground. On the other hand, they show certain failures, such as fragility of the sidewalls under shocks and cracks, a certain instability at the sides and a tendency that the edges of the carcass might loosen when they are used at a high speed. In order to overcome these faults, it has been thought to stiffen the sidewalls by means of stronger material or relatively hard rubber.

The invention proposes to improve this type of tire as it is described hereinbelow with reference to FIGS. 1, 2 and 3 of the enclosed drawing which represent respectively two embodiments in a transversal cross-section and a perspective view of the embodiment of FIG. 2.

This tire comprises a carcass 10 consisting of one or several layers or plies of cord fabric seamless or with a light seam, made from cables of rayon, nylon, polyester, polyamide aromatic glass or metal, oriented along the meridian planes of the tire. The edges 11 of this carcass layer are each folded around the bead wires 12 and the filler section 13 of the bead. This carcass is covered up at the sides by the bands or strips of the sidewall 14 and it carries at its top a belt 15, which is inextensible circumferentially. The belt is surmounted by the tread 16 which has the appropriate profiles for the use of the tire. The belt 15 is built of at least two superimposed layers made out of textile or metallic cables oriented along small angles in the order of 20° with respect to the circumferential direction of the tire.

Preferably, one of the belt layers is distinctly wider than the other and its lateral edges are folded around the edge of the other layer which they cover following a width of approximately 15-25 mm. the entire belt has a width equal to the width of the surface of the tread 16.

The form of the illustrated tires is the form of the tire section in a non-inflated stage, that is the molding form. It corresponds to the characteristic shape of tires having a low profile, where the relation of height over width of the section is equal or less than 0.8, with a flat contact or bearing surface or one that is slightly convex.

With these tires, according to the invention, the sidewalls of the carcass 10 are reinforced with layers 17-18 which are made out of a relatively flexible reinforced rubbery mixture and which extend over the whole height of the sidewalls from the beads to the edges of the belt 15, whereby the upper edges of the reinforced layers or plies 17-18 insert between the carcass 10 and the lateral edges of the belt 15 following a width of approximately 15-35 mm. Preferably, these layers are made out of "anisotrope" rubber mixture, that is in a vulcanized stage being more resistant to elongation or presenting a modulus of elasticity distinctly higher in one direction than in the other direction of the layers, and the direction of the stronger resistance to elongation of these superimposed layers 17-18 are crossed from one layer to the other and with respect to the radial cable of the carcass 10, these layers form angles in the order of 20°-70°. The proportion of "anisotropy" of the rubbery mixture of the layers 17-18 is at least 2 can go up to 10 and even more. In a most resistant direction, this mixture presents — once vulcanized in the tire — a modulus of elasticity of at least 200 kg/cm$^2$ at 100% elongation.

In FIG. 1, the superimposed reinforced layer 17-18 are directly and from one edge to the other applied to the exterior side of the flanks of the carcass 10 between the carcass and the regular sidewall strips 14. Moreover, the lower edge of this unit of two superimposed layers is inserted between the filler sections 13 and the carcass 10 in the area of the beads adjacent to bead wires 12.

In FIG. 2, the superimposed reinforced layers 17-18 are placed under the sidewall bands 14, but they are spaced from the carcass 10 in the lower part of the sidewalls by sections of hard rubber 19, that have a hardness analogous to that of the filler sections 13. These sections assure a greater lateral stiffness (tightness) of the lower sidewalls portions of the tire. This construction is particularly more appropriate due to the very low form of the tire and the cylindric form of the bearing surface for the use of sport cars at speedy driving.

In the area of the edges of the belt 15, the crossed reinforced layers 17-18 are overlapping at the lateral edges of the belt already reinforced through the folding of the edges of one of the layers of the belt. These layers improve the resistance to wear and tear, the quick reaction of the tire on winding roads and its behavior in curves.

In the "shoulder" zones placed above the sidewalls, the layers 17-18 do no harm to the radial flexibility, thus assuring comfort and vertical absorption of the tire, and because of the "crossed" disposition between each other and with the radial cords of the carcass, they give a better transmission for torque and braking forces.

In the lower zones of the sidewalls, the layers 17-18 transversely stiffen the sidewalls and give a better road behavior. This effect is underlined in the case of FIG. 2 by the sections of hard rubber 19, but the disposition of the lower part of the layers 17 and 18 between these sections 19 and the filler sections 13 handles the radial flexibility of the lower parts of the sidewalls and their shock-absorbing role in a radial sense.

The rubbery mixtures which can be used for the layers 17-18 are homogeneous or relatively homogeneous mixtures obtained by incorporating reinforcing material and/or fine discontinued textile fibers into rubber, metal, glass or wooden fibers. For example, very fine glass, cotton or wooden fibers having a diameter in the order of 0.02 mm and a proportion diameter/length of at least 1 over 100, can be easily incorporated into the rubber at the rate of approximately 5-10% by weight to produce "anisotrope" mixtures, in which the reinforcement fibers are oriented following a preferential direction. As a very special reinforcing agent, also from 25 to 50 parts by weight of "polyolefin" such as polyethylene or polypropylene with a high molecular weight can be used. The rubber mixtures built up this way become strongly "anisotrope" by mixing them with cylinder mixing machines in order to obtain thin sheets in which the fine fibers or the particles of polyolefine are mostly oriented in the longitudinal sense of the sheets. The layers 17-18 are given a bias cut (aslant) at the desired angle into these rubber sheets in the form of the strips or bands which are used at the time of the manufacturing of the tires.

One of the advantages of the crossed layers 17-18 made out of rubbery mixture reinforced by short fibers or polyolefine particles lays in the fact that the layers are also very extensible when they are in a non-vulcanized stage at the time of manufacturing, in a way that the layers can easily be placed down before the shaping operation of the carcass without providing any trouble — with respect to that extensibility — to the ulterior shaping of the tire. In addition to this, this way of operating brings about an additional advantage which is the modification of the orientation of the directions of the strongest resistance of the layers 17 and 18 at the moment of the shaping of the tire. These directions form with the parallel circles of the tire bigger angles in the lower parts of the adjoining layers of the beads 12 and smaller angles at the upper parts adjoining the top of the belt. So, for instance, one will place over the carcass 10 while it is on the cylindric building drum of the tire making machine reinforced layers 17-18 made out of rubbery, "anisotrope" non-vulcanized mixture in a way that their directions of the strongest resistance are crossed according to angles of 40° with respect to the parallel or longitudinal circles of the carcass. At the moment of the shaping of the tire, the parts of the layers 17-18 adjoining the beads will not be lengthened or only very little; whereas, the parts of the layers 17-18 adjoining the top of the belt will be circumferentially strongly lengthened. As shown in FIG. 3 this results in the fact that the parts of the layers adjoining the beads will maintain an inclination a in the order of approximately 40° with respect to the parallel circles of the tire; whereas the the inclination b of the directions of the strongest resistance of the layers can decrease to approximately 20° at the top of the tire. At the shaped and vulcanized tire, the angles of the directions of the strongest resistance of the crossed layers 17-18 are decreasing from the beads to the top of the belt, which gives at the same time the advantage of handling the radial flexibility of the lower parts of the sidewalls and to increase the reinforcement in the upper parts of the sidewalls and in the lateral zones of the top of the tire i.e., the crown.

What is claimed is:

1. A tire comprising a tread, a radial carcass formed of at least one of cord fabric, a top belt located under the tread of the tire, and sidewalls having external sidewall strips, said sidewalls including at least two reinforcing layer comprised of a reinforced rubber mixture exhibiting anisotropy of at least 2:1 with a modulus of elasticity of at least 200 kg/cm$^2$ at 100% elongation in the direction of the strongest resistance to elongation, the directions of the strongest resistance of each of the reinforcing layers being crossed at angles on the order of 20°-70° with respect to the cords of the radial carcass, said reinforcing layers being more extensible than said radial carcass and being placed under said sidewall strips and extending over the entire height of each of the sidewalls and the upper end portions of said reinforcing layers being inserted between the carcass and the lateral edges of the belt for a distance of approximately 15 to 35 mm.

2. A tire according to claim 1, wherein said belt has edges that are reinforced by folding the edges of at least one of the layers forming the belt over the edges of another layer forming the belt, the upper end portions of the rubber reinforcing layers being inserted between the carcass and the reinforced lateral edges of the belt.

3. A tire according to claim 1, wherein the lower edges of the reinforcing layers of the sidewalls are inserted between the filler sections of the beads of the tire and the carcass.

4. A tire according to claim 1, wherein the reinforcing layers of the sidewalls consist of two superimposed layers of the reinforced rubbery mixture, said reinforced rubbery mixture containing reinforcing fibers.

5. A tire according to claim 1, wherein the direction of the strongest resistance to elongation of the reinforcing layers form with the parallel circles of the tire, angles which are decreasing from the lower portions of these layers adjoining the beads of the tire to the upper portions of the layers adjoining the ends of the belt.

6. A tire according to claim 1, wherein a lower portion of each of the sidewalls is also stiffened by means of a section of hard rubber that is placed between the carcass and the reinforcing layers of the sidewalls.

7. A tire according to claim 2, wherein a lower portion of each of the sidewalls is stiffened by means of a section of hard rubber that is placed between the carcass and the reinforcing layers of the sidewalls.

8. A tire according to claim 3, wherein a lower portion of each of the sidewalls is also stiffened by means of a section of hard rubber that is placed between the carcass and the reinforcing layers of the sidewalls.

9. A tire according to claim 1, wherein said reinforced rubbery mixture contains reinforcing particles of a higher molcular weight polyolefin.

* * * * *